United States Patent [19]

Lagace

[11] Patent Number: 5,046,402
[45] Date of Patent: Sep. 10, 1991

[54] ROTARY TO AXIAL MOTION CONVERTING DEVICE WITH GROOVE IN PISTON GUIDE

[76] Inventor: Jean-Hugues Lagace, 118 Grande-Ligne, Lac Etchemin, Quebec, Canada, G0R 1S0

[21] Appl. No.: 512,802

[22] Filed: Apr. 23, 1990

[51] Int. Cl.$^5$ .................. F01B 3/00; F15B 13/04; B66D 1/08; E06C 7/08
[52] U.S. Cl. .................................. 92/33; 92/31; 92/32; 91/440; 188/313; 254/361; 254/377; 182/238
[58] Field of Search .................. 91/440; 92/31, 32, 33; 182/238; 188/313, 318, 322.17; 254/361, 377

[56] References Cited

U.S. PATENT DOCUMENTS

| | | | |
|---|---|---|---|
| 141,378 | 7/1873 | Pelham | 182/238 |
| 277,891 | 1/1883 | Ellithorpe | 182/238 |
| 303,344 | 8/1884 | Uren | 92/31 |
| 547,459 | 8/1895 | Seymour | 92/33 |
| 628,736 | 6/1899 | Young | 182/238 |
| 1,089,408 | 3/1914 | Ganderton | 92/31 |
| 1,173,326 | 2/1916 | Taylor | 92/31 |
| 1,208,115 | 12/1916 | Eynon et al. | 92/33 |
| 1,806,083 | 5/1931 | Roberts | 92/33 |
| 2,204,649 | 6/1940 | Barnhart | 92/31 |
| 2,261,261 | 11/1941 | Kubera | 182/238 |
| 2,500,884 | 3/1950 | Tessin | 182/238 |
| 2,502,896 | 4/1950 | Sherbrook et al. | 182/238 |
| 2,594,484 | 4/1952 | Nixon | 254/377 X |
| 2,936,737 | 5/1960 | Miller | 92/31 |
| 3,114,242 | 12/1963 | Allen | 92/33 |
| 3,595,528 | 7/1971 | Virkki | 182/238 |
| 3,732,783 | 5/1973 | Emeriaker | 92/33 X |
| 3,834,671 | 9/1974 | Du Mesnil du Buisson | 182/238 X |
| 4,018,423 | 4/1977 | Belew | 182/238 |
| 4,498,371 | 2/1985 | Lew et al. | 92/33 |
| 4,603,616 | 8/1986 | Zajac | 92/33 |
| 4,665,558 | 5/1987 | Burke | 92/33 X |
| 4,753,071 | 6/1988 | Sugden | 188/313 X |

FOREIGN PATENT DOCUMENTS

| | | | |
|---|---|---|---|
| 0568753 | 11/1977 | U.S.S.R. | 92/33 |
| 1258425 | 9/1986 | U.S.S.R. | 182/238 |

Primary Examiner—Edward K. Look
Assistant Examiner—John Ryznic
Attorney, Agent, or Firm—Pierre Lespérance

[57] ABSTRACT

The device serves to convert rotary motion to hydraulic pressure and vice versa. A piston assembly is entirely located within a cylinder, including a piston head and a piston stem fixed to the piston head. The piston assembly divides the cylinder into two distinct variable volume chambers to be filled with a fluid. The piston assembly is prevented from rotating relative to the cylinder. A rotary shaft extends through one closed end of the cylinder and has an inner portion in telescopic and threaded engagement with the piston stem. Two fluid ports communicate with the respective chambers for allowing a fluid to alternatively exit from and enter into the chambers. Rotation of the shaft causes longitudinal displacement of the piston assembly relative to the cylinder or vice versa. The device can have different applications: for instance, if a throttle valve is connected across the two ports, controlled braking of the shaft rotated by an external torque, is obtained. If a hydraulic ram is connected across the two ports, rotation of the shaft by an external torque will actuate the ram. If the pitch of the complementary threads of the piston stem and shaft is high enough, pressure fluid applied to the piston will rotate the shaft.

1 Claim, 2 Drawing Sheets

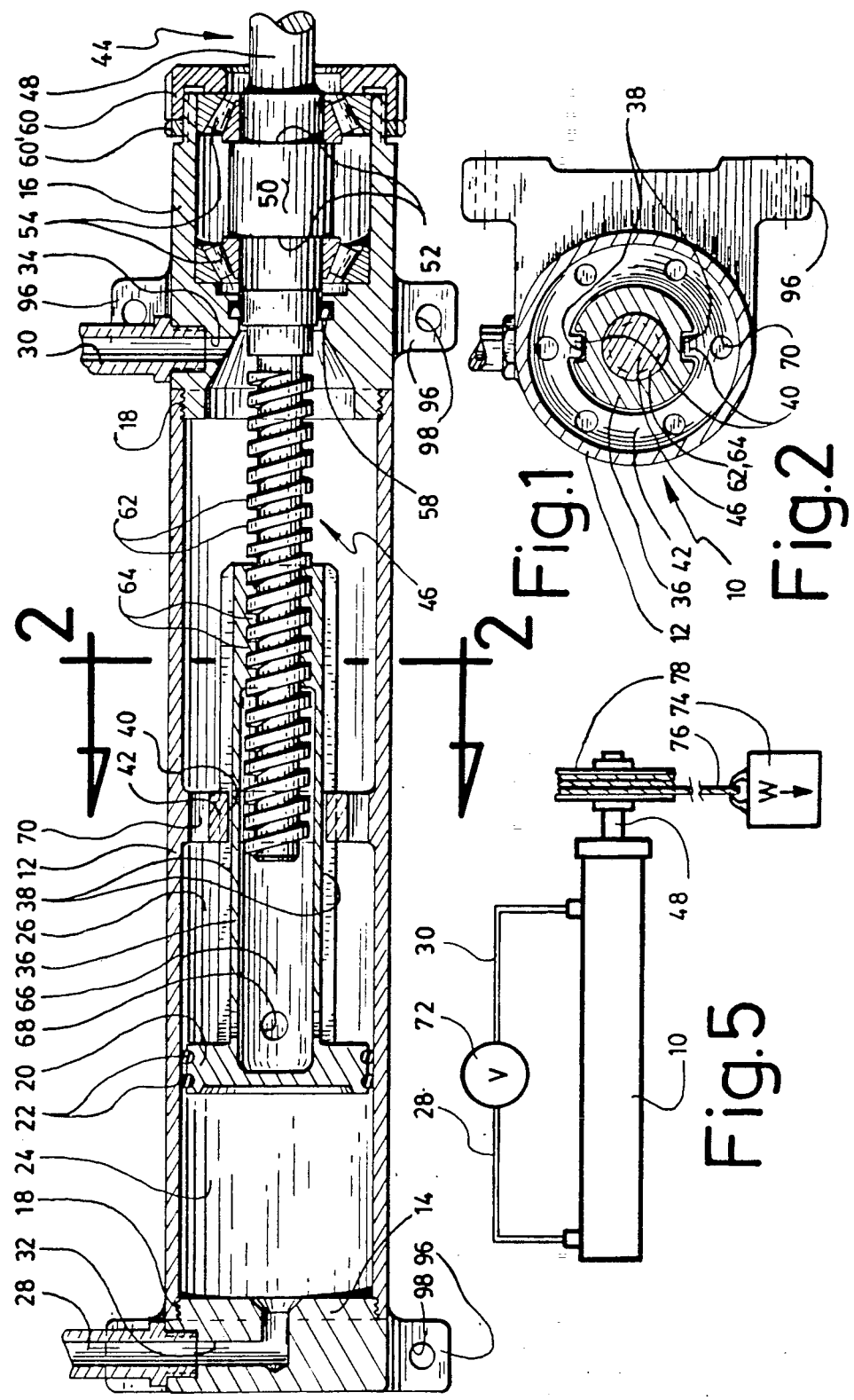

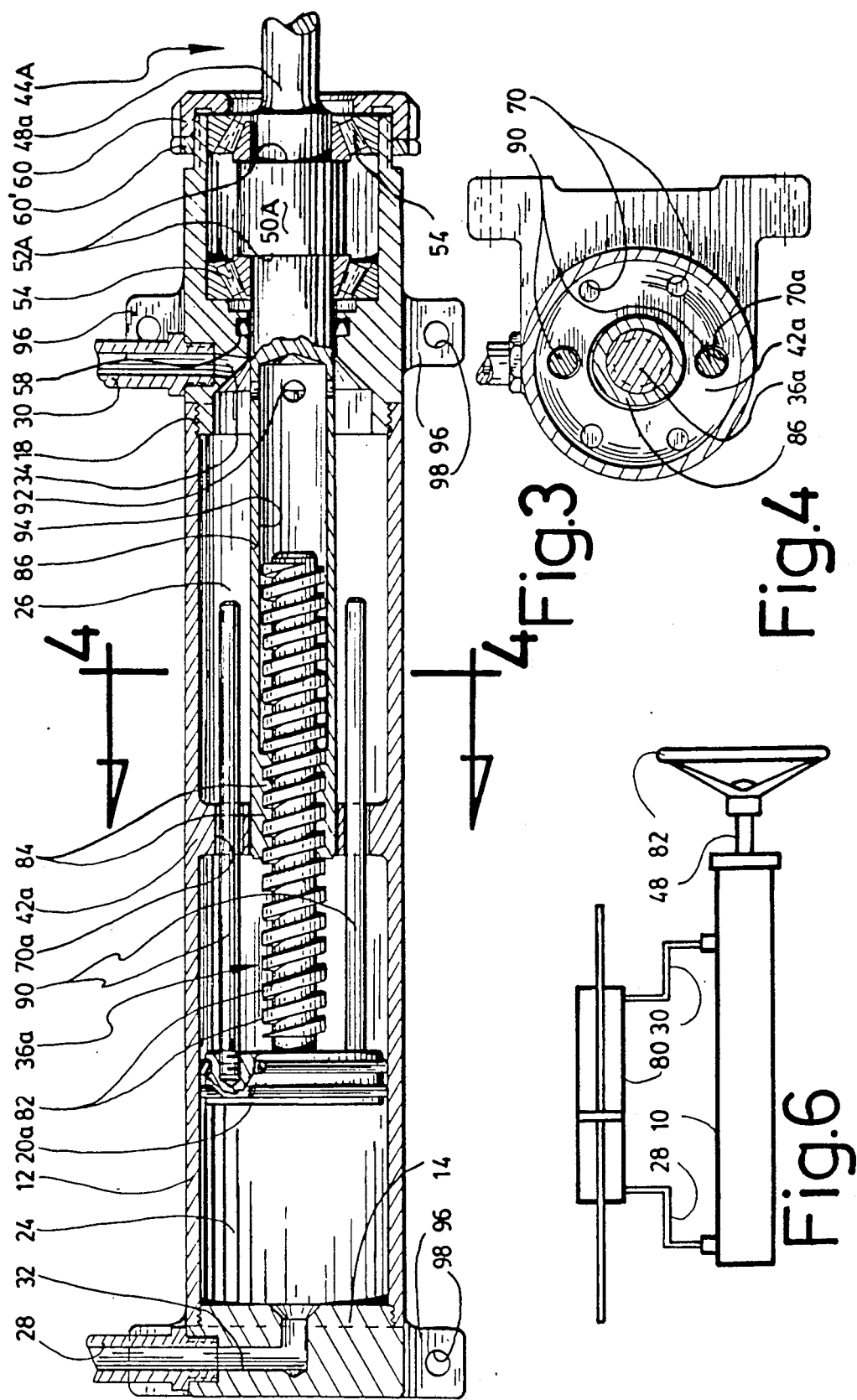

ROTARY TO AXIAL MOTION CONVERTING DEVICE WITH GROOVE IN PISTON GUIDE

FIELD OF THE INVENTION

The present invention relates to a motion-converting device and, more particularly, to a device for converting rotary motion to hydraulic pressure, and vice versa.

SUMMARY OF THE INVENTION

Known such devices are mainly used as load-lowering apparatus, using the hydraulic pressure developed as a brake for retarding the rotation of a reel on which is wound a cable tensioned by the load. Such an arrangement is found in U.S. Pat. No. 3,595,528 dated July 27, 1971, inventor Virkki. A cable-carrying reel 1 has complementary threads with a piston head 5 causing longitudinal displacement of the same within a hydraulic cylinder space 2. The fluid is pressurized on one side of the piston and forced into the other side through a restricted passage 12 in piston head 5. The latter is prevented from rotating, because it slides on a shaft 4 of square cross- n section, fixed at 8 to support brackets 6. In this arrangement, the differential pressure of the hydraulic fluid between the two sides of the piston causes leakage not only through the restricted opening 12 but also across the complementary threads 2A, since the same must necessarily have a clearance. Therefore, the load cannot be completely stopped. In this patent, there are no means to adjust the retarding action on the reel in accordance with the weight of the load. The same remarks apply to U.S. Pat. No. 277,891 dated May 22, 1883 to Ellithorpe and U.S. Pat. No. 2,500,884 dated Mar. 14, 1950 to Tessin.

In U.S. Pat. No. 2,261,261 dated Nov. 4, 1931 to Kubera, the fluid is transferred from one side to the other side of the piston head through an external passage controlled by a throttling valve, as indicated at 33 in FIG. 2 and, thus, the retarding action on the cable-carrying pulley 21 can be controlled to a certain extent. However, there is always the unpredictability of fluid leakage between the complementary threads of the shaft 10 and piston head 12. Also, because of this leakage, the device cannot be used for other purposes.

OBJECTS OF THE PRESENT INVENTION

The general object of the present invention is therefore to improve the efficiency of the above-noted device by eliminating fluid leakage across the piston head.

Another object of the present invention is to provide a load-lowering device provided with a hydraulic brake capable of adjustment in accordance with the load being lowered and capable of complete stoppage.

Another object of the present invention is to provide a device of the character described, used to actuate a hydraulic ram by applying a torque to its input shaft.

Another object of the present invention is the provision of a device of the character described, in which the linear force obtained at the ram is increased with respect to the torque applied to the input shaft.

Another object of the present invention is a device of the character described, which is of simple and long-lasting construction.

SUMMARY OF THE INVENTION

There is disclosed a device converting rotary motion to hydraulic pressure, and vice versa.

The device comprises a cylinder closed at both ends, a piston assembly entirely located within the cylinder and including a piston head and a piston stem fixed to the piston head, the piston assembly dividing the cylinder into two distinct variable volume chambers to be filled with a fluid, the piston assembly preventing the fluid transfer from one chamber to the other across the assembly. Means are provided to prevent rotation of the piston assembly relative to the cylinder, while allowing its longitudinal movement. A rotary shaft extends through one closed end of the cylinder and includes an outer portion exteriorly of said cylinder and an inner portion interiorly of the cylinder. The piston stem and the shaft inner portion are co-axial and complementarily threaded and in telescopic and threaded engagement. Means prevent axial shifting of the shaft while allowing its rotation and fluid ports communicate with the respective chambers for allowing a fluid to alternately exit and enter into said chambers, whereby rotation of the shaft by a torque applied to its external portion will cause longitudinal displacement of the piston assembly relative to the cylinder and consequent pressurizing of the fluid in the chambers. The pitch of the complementary threads can be adjusted to obtain the desired force. The piston stem can be hollow with internal threads engaging external threads of the shaft inner portion and the sleeve-like piston stem is provided at its outer surface with a longitudinal groove engaged by a finger of a partition fixed to the cylinder and surrounding the stem on one side of the piston head. This prevents rotation of the piston assembly. The partition and also the sleeve-like piston stem adjacent the piston head are provided with openings for free circulation of the hydraulic fluid in the associated variable volume chamber.

In another embodiment, the shaft inner portion forms a sleeve with internal threads engaging external threads of a rod-like piston stem. Rotation of the piston assembly is prevented by guide rods fixed to the piston head and slidably mounted and guided within holes made in a cylinder partition surrounding the shaft inner end. The sleeve-like shaft inner portion has openings for free liquid circulation.

The device can be used as a load-lowering system, with a throttling valve connected across the two ports and a load-supporting cable wound on a reel fixed to the shaft external portion. The valve is used to control the descent and also to completely stop the load in its descent, if desired.

The device can also be used to actuate a ram connected across the two ports by applying a torque on the shaft outer portion.

BRIEF DESCRIPTION OF THE DRAWINGS

FIG. 1 is a longitudinal section of a first embodiment of the invention;

FIG. 2 is a cross-section along line 2—2 of FIG. 1;

FIGS. 3 and 4 are views similar to FIGS. 1 and 2, respectively, but showing a second embodiment of the invention; and FIG. 5 and 6 are schematic views illustrating two applications of the device of the invention.

DETAILED DESCRIPTION OF THE INVENTION

The first embodiment of the invention comprises a hydraulic cylinder, indicated at 10, and including a cylindrical tube 12 closed at both ends by end caps 14 and 16 threadedly fitted at 18 to the cylindrical tube in fluid-tight manner. A piston head 20 is provided with O-rings 22 for sliding and sealing contact with the inner surface of cylindrical tube 12. piston head 20 has no through-bores and, consequently, divides cylinder 10 in two variable volume chambers 24, 26 in a fluid-tight manner. These chambers are on opposite sides of the piston head and can be interconnected via tubings 28, 30 by ports 32 and 34 in communication with the respective chambers and formed in end caps 14 and 16, respectively.

Piston head 20 is fixed to, or preferably made integral with, a sleeve-like piston stem 36, which extends axially of the cylindrical tube from one side of the piston head entirely within the chamber 26. The piston assembly formed by the piston head 20 and piston stem 36 is prevented from rotation while allowed to move axially relative to cylinder 10 by the following means.

A pair of diametrically opposite longitudinal grooves 38 are formed at the outer surface of piston stem 36 and are engaged by fingers 40, dependent from a partition 42 surrounding the piston stem 36 and fixed to, or integral with, the cylinder tube 12 within the chamber 26. This partition 42, together with the end cap 14, determines the maximum stroke of the piston assembly.

A rotary shaft 44 extends through one closed end namely end cap 16 of the cylinder 10 and has an inner portion 46 located within the chamber 26 and an outer portion 48 exteriorly of the cylinder 10. The shaft intermediate portion 50, disposed within the end cap 16, is of an enlarged diameter to form opposite steps 52 engaged by combined radial and thrust bearings 54, which permit rotation of the shaft but prevent its axial displacement with respect to the cylinder 10.

A seal 58 carried by the end cap 16 prevents leakage of hydraulic oil from the chamber 26.

A closure 60 surrounds the shaft outer portion 48 and is screwed on the end cap 16 to maintain the shaft and bearing in position and to allow, when removed, disassembly of the shaft from within the cylinder 10. The shaft inner portion 46 carries external threads 62, which are in threaded engagement with complementary threads 64 formed at the inner surface of the sleeve-like piston stem 36. Therefore, the shaft inner portion 46 is in telescopic engagement with the piston stem 36 and also in threaded engagement therewith.

The two chambers 24, 26 are filled with a hydraulic fluid, such as hydraulic oil. The space 66 defined within the sleeve-like piston stem 36 between the free end of the shaft inner portion 46 and the piston head 20 is also filled with oil, and this oil is free to circulate within the chamber 26, because the space 66 is in free communication with said chamber through one or more openings 68 made through the piston stem 36 adjacent the piston head 20. Similarly, partition 42 is provided with through-bores 70 allowing free fluid circulation on both sides of the partition. From this, it follows that there is no fluid pressure differential across threads 62, 64 and the telescopic movement of the shaft internal portion 46 within the hollow piston stem 36 is not retarded by fluid pressure.

Obviously, rotation of the shaft 44 in one direction will cause axial displacement of the piston assembly in one direction and pressurization of the fluid ahead of the piston assembly. The fluid will be expelled through the associated port and returned through the other port.

One possible application of the device is shown in FIG. 5, wherein the two ports 32 and 34 are connected through their associated tubings 28, 30 across a throttling valve 72. The device can be used as a load-lowering device, namely in which a load 74 is connected to a cable 76 wound on a reel 78 fixed to the shaft outer portion 48. The torque applied by the load 74 on the reel 78 and shaft outer portion 48 causes axial movement of the piston assembly, and this is braked by the valve 72 which can be adjusted to any value, depending on the weight of the load 74. The valve can be completely closed to stop the load in its descent, if desired. Obviously, the device of the invention can be attached to the load itself and the free end of the cable attached to an anchor point from which the load is to be lowered.

The device of the invention can also be used to actuate a double acting hydraulic ram in the manner shown in FIG. 6. Tubings 28, 30 are connected to the opposite ends of a hydraulic ram 80, whereby rotation of the shaft 44 by an electric or hydraulic motor, or by a manually-actuated wheel 82, will cause movement of the piston rod of the hydraulic ram in either direction in accordance with the direction of rotation of output shaft 44. The ram can actuate any mechanism, for instance the steering system of a vehicle. The ram 80 can be used to operate a tool or a raising device, or to adjust an air suspension system in a vehicle and other applications.

FIG. 3 and 4 show another embodiment similar to the embodiment of FIGS. 1 and 2. The differences with respect to the first embodiment are as follows. The hollow piston stem 36 of the first embodiment is replaced by a rod-like piston stem 36A provided with external threads 82 screwed within complementary internal threads 84 of a sleeve-like shaft inner portion 86, which is part of the rotary shaft 44A having an outer portion 48A and an intermediate portion 50A of increased diameter to form steps 52A engageable by the bearings 54 which prevent axial displacement of the shaft, while allowing its rotation.

In order to prevent rotation of the piston assembly, guiding rods 90 are fixed to the piston head 20A and extend through the through-bores 70 of the partition 42A for guided axial movement therein. The through-bores 70, together with an opening 92, made at the bottom of the space 94, formed in the hollow inner shaft portion 86, allows free liquid movement within the variable volume chamber 26. This embodiment operates in the same manner as in the first embodiment.

In both embodiments, the end caps 14, 16 may be provided with ears 96 for fixing the device to a support by means of bolts, or the like, passing through holes 98 of these ears.

It will be noted that the multiplying effect obtained by the threaded connection between the shaft and the piston stem is inversely proportional to the pitch of the threads. Also, it will be noted that, if the pitch is sufficiently high, that is the threads more inclined with respect to the shaft longitudinal axis, it is possible to cause rotation of the shaft in one direction or the other by supplying hydraulic fluid under pressure through the selected one of the two ports.

I claim:
1. A device for converting rotary motion into hydraulic pressure and vice versa, comprising a cylinder closed at both ends, a piston assembly entirely located within said cylinder and including a piston head and a piston stem fixed to said piston head, said piston assembly dividing said cylinder into two distinct variable volume first and second chambers to be filled with a fluid, said piston assembly preventing fluid transfer from one chamber to the other, means preventing rotation of said piston assembly while allowing its longitudinal movement relative to said cylinder, a rotary shaft extending through the one closed end of said cylinder which is adjacent said first chamber and including an outer portion exteriorly of said cylinder and an inner portion interiorly of said cylinder, said stem and said shaft inner portion being co-axial and complementarily threaded and being in telescopic and threaded engagement, means preventing axial shifting of said shaft while allowing its rotation and fluid ports at the ends of said cylinder in communication with the respective chambers for allowing a fluid to alternately exit from and enter into said chambers, whereby rotation of said shaft by a torque applied to its external portion will cause longitudinal displacement of said piston assembly within said cylinder, or displacement of said piston assembly under hydraulic pressure will cause rotation of said shaft; wherein said shaft inner portion is hollow with a closed end and with inner threads and said piston stem forms a rod member with outer threads and telescopically engages within the hollow inner shaft portion; and wherein the inner end of said hollow shaft portion is in communication with said first chamber through an opening made therein; wherein said means preventing rotation of said piston assembly comprises a partition fixed to said cylinder and extending within said first chamber and surrounding said shaft inner portion, said partition having through-bores and guide rods fixed to said piston head extending longitudinally within said first chamber and through said throughbores to be guided by the same.

* * * * *